United States Patent
Matsuo et al.

(10) Patent No.: US 10,578,741 B2
(45) Date of Patent: Mar. 3, 2020

(54) DISTANCE DETECTION DEVICE AND DISTANCE DETECTION METHOD

(71) Applicant: Panasonic Intellectual Property Management Co., Ltd., Osaka (JP)

(72) Inventors: Tomohiro Matsuo, Fukuoka (JP); Yoshinobu Kouno, Fukuoka (JP); Shin Tabuchi, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 277 days.

(21) Appl. No.: 15/518,807

(22) PCT Filed: Oct. 29, 2015

(86) PCT No.: PCT/JP2015/005437
§ 371 (c)(1),
(2) Date: Apr. 13, 2017

(87) PCT Pub. No.: WO2016/075885
PCT Pub. Date: May 19, 2016

(65) Prior Publication Data
US 2017/0242126 A1    Aug. 24, 2017

Related U.S. Application Data

(60) Provisional application No. 62/078,228, filed on Nov. 11, 2014.

(30) Foreign Application Priority Data

Feb. 26, 2015    (JP) ................................ 2015-037210

(51) Int. Cl.
*G01S 17/89*    (2006.01)
*G01S 7/486*    (2020.01)
(Continued)

(52) U.S. Cl.
CPC ............ *G01S 17/89* (2013.01); *G01S 7/4868* (2013.01); *G01S 17/10* (2013.01); *H04N 5/265* (2013.01); *H04N 5/335* (2013.01)

(58) Field of Classification Search
CPC ........................................................ G01C 3/08
See application file for complete search history.

(56) References Cited

U.S. PATENT DOCUMENTS

| | | | | |
|---|---|---|---|---|
| 3,682,553 A | * | 8/1972 | Kapany | G03B 35/00 |
| | | | | 342/180 |
| 6,057,909 A | * | 5/2000 | Yahav | G01C 11/025 |
| | | | | 313/103 CM |
| 2005/0225478 A1 | | 10/2005 | Nakamura | |

FOREIGN PATENT DOCUMENTS

| | | |
|---|---|---|
| JP | 2001-116516 | 4/2001 |
| JP | 2003-130953 A | 5/2003 |

(Continued)

OTHER PUBLICATIONS

International Search Report of PCT application No. PCT/JP2015/005437 dated Jan. 26, 2016.

*Primary Examiner* — Luke D Ratcliffe
(74) *Attorney, Agent, or Firm* — McDermott Will & Emery LLP

(57) ABSTRACT

A distance detection device generates a distance image indicating a distance to an object positioned within a distance range targeted for measurement using a TOF system. The distance detection device includes a light source that illuminates the object with light, a light sensor that generates a detection signal by receiving a reflection light which is the illumination light reflected from the object, a controller that controls an exposure timing of the light sensor with respect to an illumination timing of the light from the light source in each of measurement ranges of a plurality of measurement ranges obtained by dividing the distance range, and a (Continued)

processor. The processor generates distance information by calculating distances to objects within the measurement ranges based on the detection signal in each of the measurement ranges, and generates the distance image indicating the distance to the object within the distance range targeted for measurement using the generated plural distance information items.

5 Claims, 13 Drawing Sheets

(51) Int. Cl.
*G01S 17/10* (2020.01)
*H04N 5/265* (2006.01)
*H04N 5/335* (2011.01)

(56) References Cited

FOREIGN PATENT DOCUMENTS

| | | |
|---|---|---|
| JP | 2004-012338 | 1/2004 |
| JP | 2005-300233 | 10/2005 |
| JP | 2008-241258 | 10/2008 |
| JP | 2012-220366 | 11/2012 |

\* cited by examiner

FIG. 4

| Mode | Mode No. k | Closest End Ds(k) | Farthest End De(k) | Range Length D(k)=De(k)−Ds(k) | Order of Measurement |
|---|---|---|---|---|---|
| Shout Distance | 1 | 0.4m | 2.2m | 1.8m | 3 |
| Intermediate Distance | 2 | 1.8m | 7.3m | 5.5m | 2 |
| Long Distance | 3 | 6.7m | 12.3m | 5.6m | 1 |
| Entire Distance | - | 0.4m | 12.3m | 11.9m | - |

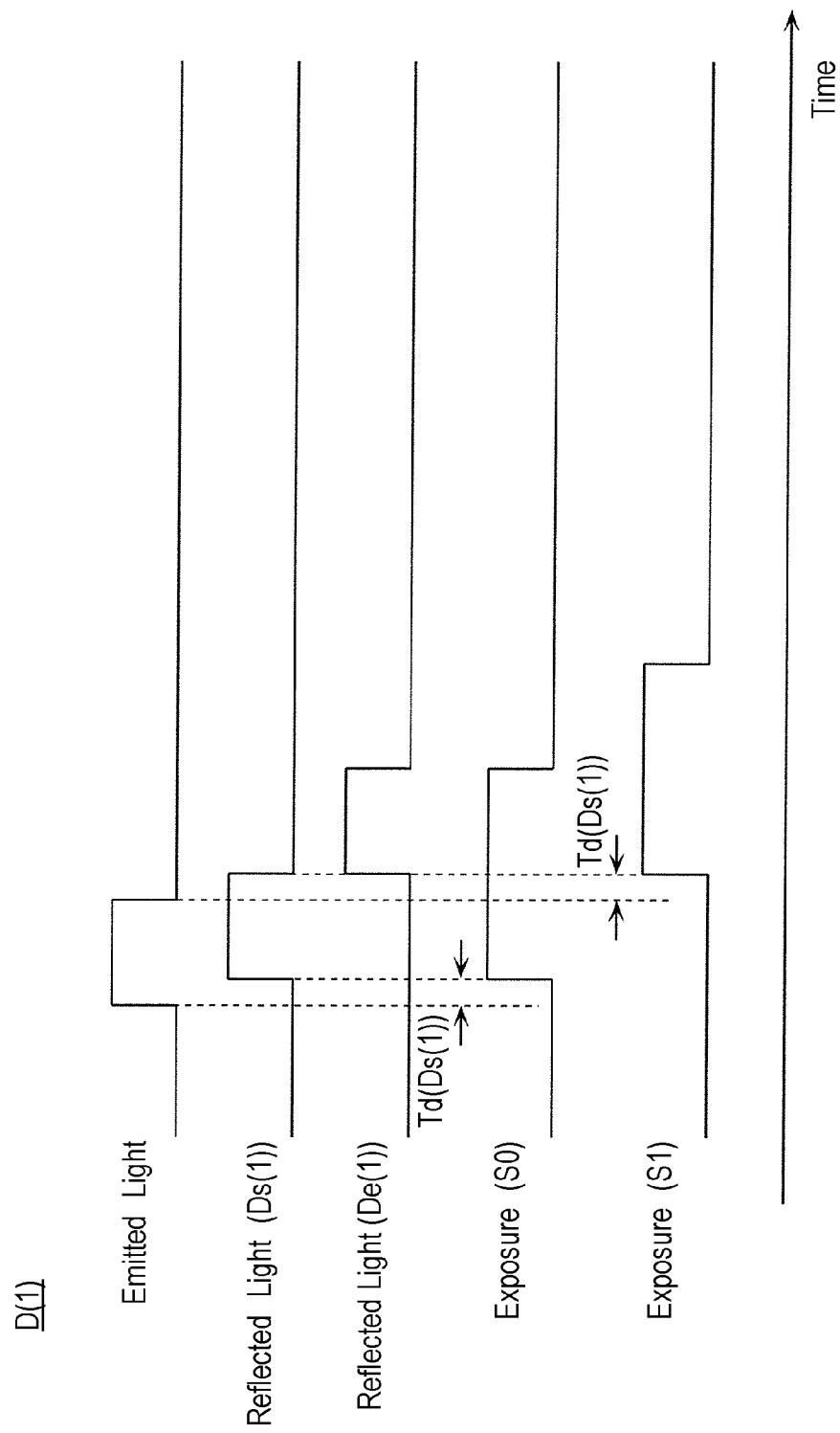

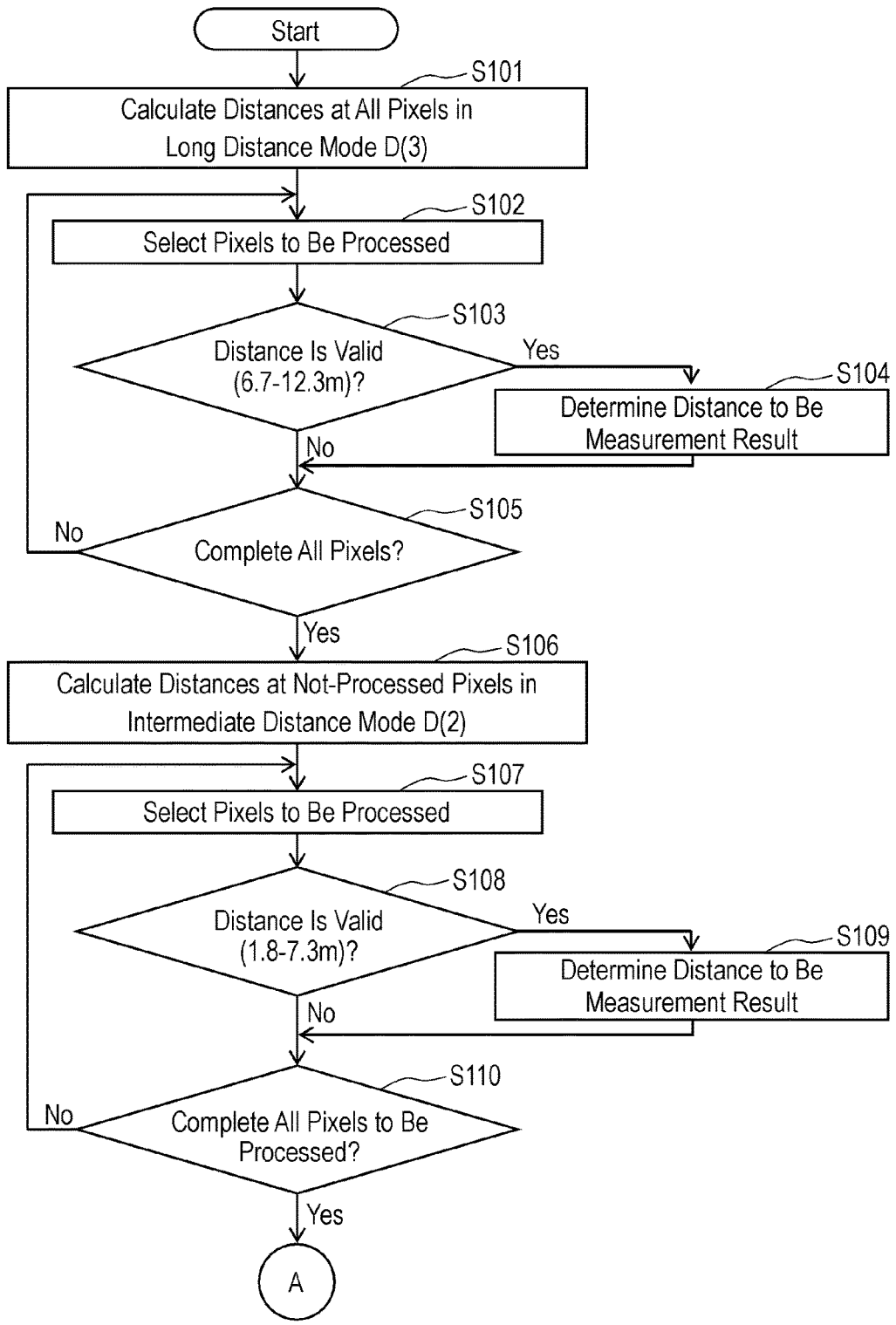

DISTANCE DETECTION DEVICE AND DISTANCE DETECTION METHOD

This application is a U.S. national stage application of the PCT international application No. PCT/JP2015/005437 filed on Oct. 29, 2015, which claims the benefit of priority of U.S. provisional application No. 62/078,228 filed on Nov. 11, 2014 and the benefit of foreign priority of Japanese patent application No. 2015-037210 filed on Feb. 26, 2015, the contents all of which are incorporated herein by reference.

TECHNICAL FIELD

The present invention relates to a distance detection device and a distance detection method that generates a distance image indicating a distance to an object by a time of flight (TOF) method.

BACKGROUND ART

A method of detecting a distance to an object by a time of flight (TOF) method is known. For example, PTL 1 discloses a device that detects a three-dimensional shape of an object by illuminating the object with light. The device performs a pre-ranging and automatically adjusts an exposure timing based on the result of the pre-ranging.

PTL 2 discloses a device which calculates a distance by emitting intensity-modulated light to an object at plural light-emitting timings and detecting reflection light reflected on the object at the respective timings.

CITATION LIST

Patent Literature

PTL 1: Japanese Patent Laid-Open Publication No. 2001-116516
PTL 2: Japanese Patent Laid-Open Publication No. 2008-241258

SUMMARY

A distance detection device includes a light source that emits light to an object, a light sensor that generates a detection signal by receiving a reflection light obtained by reflecting the light emitted from the light source on the object, and a controller that controls an exposure timing of the light sensor with respect to an emitting timing of the light from the light source in each of measurement ranges into which the distance range is divided.

The distance detection device reduces an amount of processing for the evaluation processing using the distance image, and reduces data amount of the distance image.

BRIEF DESCRIPTION OF DRAWINGS

FIG. 4 illustrates dividing distance ranges of the distance detection device in accordance with the embodiment.
FIG. 9 illustrates timing of a short distance measurement processing of the distance detection device in accordance with the embodiment.
FIG. 10A is a flowchart of the distance detection processing of the distance detection device in accordance with the embodiment.

DETAIL DESCRIPTION OF PREFERRED EMBODIMENT

An exemplary embodiment will be detailed with reference to the drawings below. The exemplary embodiments described below represent just examples of the present invention. Values, shapes, materials, configuration elements, arrangement positions and connection modes of the configuration elements, steps, the order of the steps, and the like in the exemplary embodiment are just examples, and do not intend to limit the present invention. In addition, among the configuration elements in the exemplary embodiment described below, the configuration element which is not described in an independent claim indicating top-level concepts will be described as an arbitrary configuration element.

Figure 1:
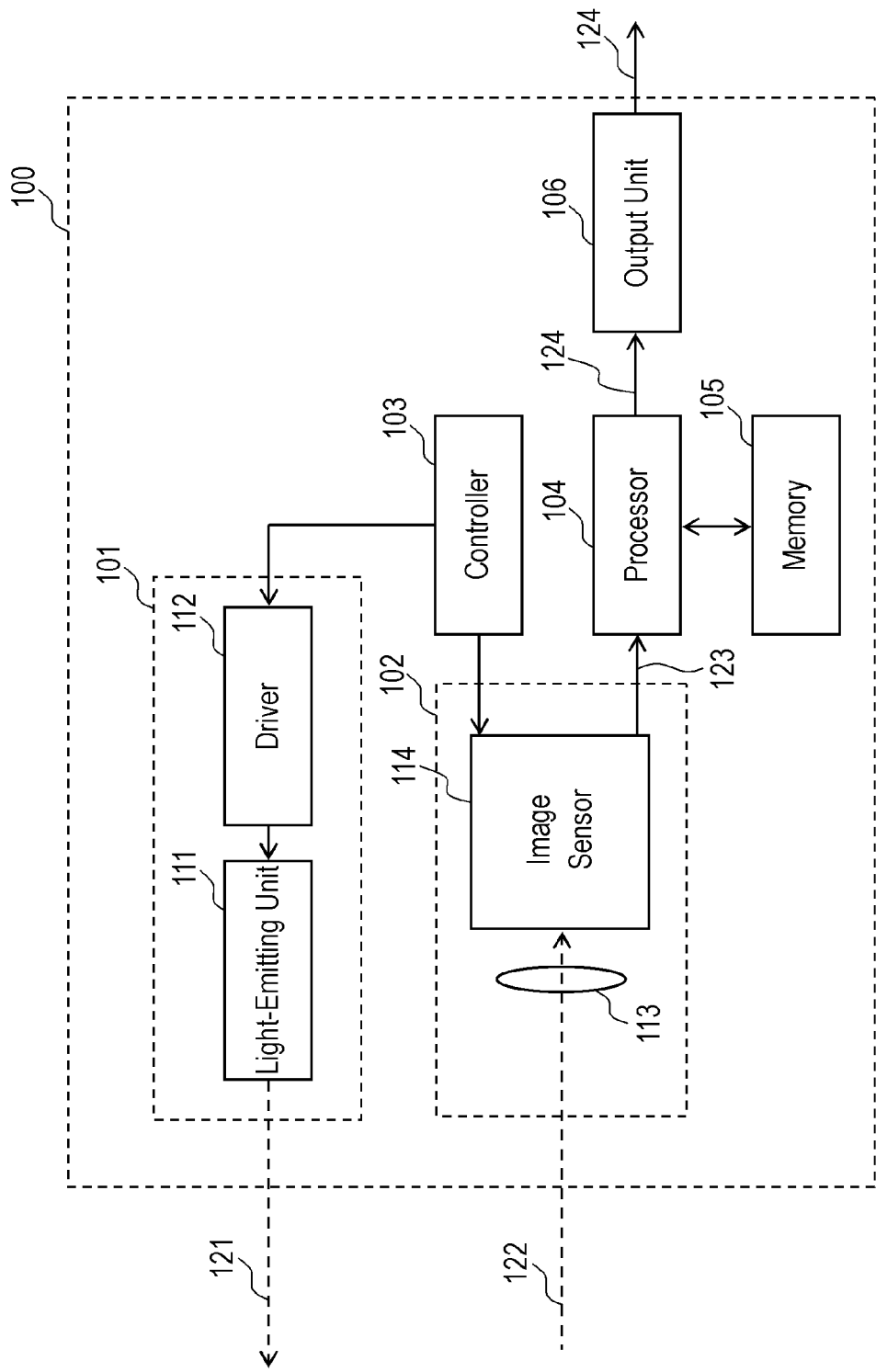
FIG. 1 is a block diagram of a distance detection device in accordance with an exemplary embodiment.

FIG. 1 is a block diagram of distance detection device 100 in accordance with an exemplary embodiment.

Distance detection device 100 illustrated in FIG. 1 generates distance image 124 indicating a distance to an object positioned within a distance range to be measured by a TOF system. Distance detection device 100 can be used in, for example, three-dimensional image sensor. Distance detection device 100 includes light source 101, light sensor 102, controller 103, processor 104, memory 105, and output unit 106.

Light source 101 emits light 121 to an object.

Light source 101 includes light-emitting unit 111 and driver 112. Light-emitting unit 111 emits illumination light 121. Light-emitting unit 111 may be implemented by, for example, a laser diode (LD) or a light emitting diode (LED). Driver 112 supplies power to light-emitting unit 111 and controls light emitted from light-emitting unit 111.

Light sensor 102 generates detection signal 123 by receiving reflection light 122 obtained by reflecting illumination light 121 on the object.

Light sensor 102 includes lens 113 and image sensor 114. Lens 113 focuses reflection light 122 on image sensor 114. Image sensor 114 receives reflection light 122 and generates detection signal 123 that is an image having a value corresponding to an amount of received light. For example, image sensor 114 is implemented by a charge coupled device (CCD) image sensor or a complementary metal-oxide-semiconductor (CMOS) image sensor.

Controller 103 controls illumination timing of light source 101 and light reception timing (an exposure period) of light sensor 102. Specifically, controller 103 controls the exposure timing of light sensor 102 with respect to the illumination timing of the light from light source 101 for each measurement range into which the distance range to be measured is divided. That is, controller 103 causes light sensor 102 to generate detection signal 123 used for generating the distance image (distance information) indicating the distance to the object within the measurement range by controlling light source 101 and light sensor 102 for each measurement range described above.

Processor 104 generates distance image 124 using detection signal 123. Specifically, processor 104 generates the distance information for each measurement range by calculating the distance to the object within the measurement range based on detection signal 123. Next, processor 104 generates distance image 124 indicating the distance to the object within the entire distance range using the generated plural distance information in plural measurement ranges.

For example, controller 103 and processor 104 are implemented by a field programmable gate array (FPGA). At least one of controller 103 and processor 104 may be implemented by a reconfigurable processor in which connection or setting of circuit cells in an LSI can be reconfigured, by dedicated hardware (circuit), or by a program execution unit, such as a CPU or a processor, reading and executing a software program stored in a recording medium, such as a hard disk or a semiconductor memory.

Memory 105 is, for example, a RAM and stores data and intermediate data used for calculation by the processor 104.

Output unit 106 is an interface for outputting distance image 124 to the outside of distance detection device 100, and for example, is a USB interface. For example, output unit 106 outputs distance image 124 to an external personal computer (PC) or the like. Here, only the output function to the outside from distance detection device 100 is described. However, a control signal, a program or the like may be input to distance detection device 100 from the external PC or the like via the interface.

An operation of distance detection device 100 in accordance with the embodiment will be described below.

Figure 2:
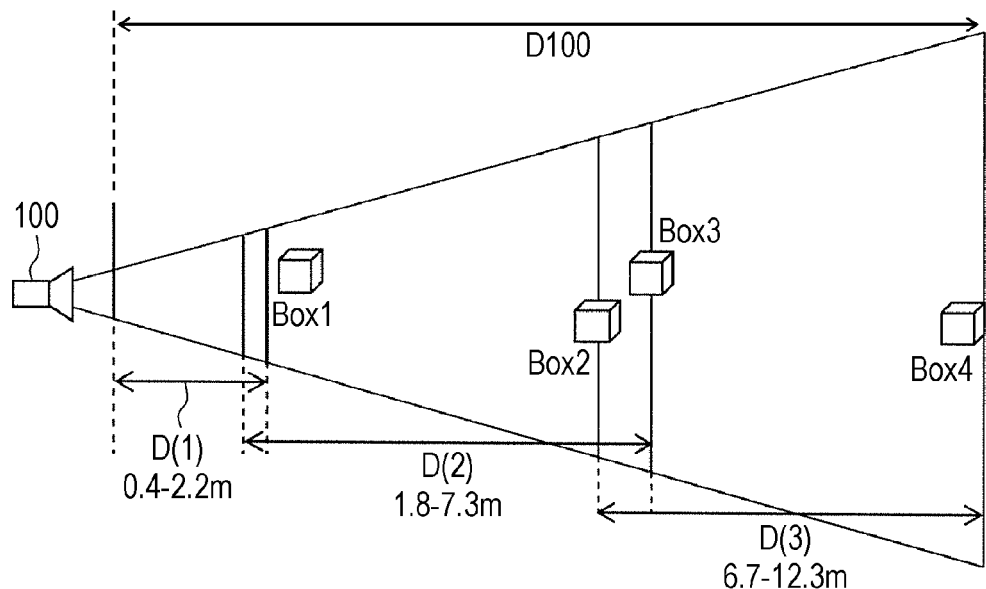
FIG. 2 illustrates a detection processing by the distance detection device in accordance with the embodiment.
Figure 3:
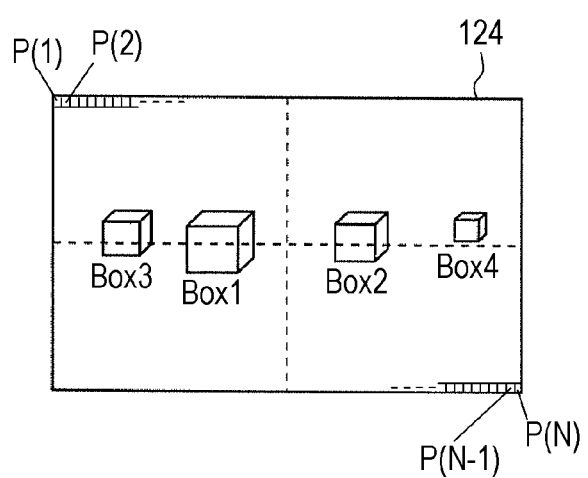
FIG. 3 illustrates a distance image generated by the distance detection device in accordance with the embodiment.

FIG. 2 illustrates an example of dividing entire distance range D100 to be measured into plural measurement ranges D(1) to D(3). FIG. 3 illustrates an example of distance image 124 obtained from the example illustrated in FIG. 2. FIG. 4 illustrates conditions for each measurement range.

In this example, distance range D100 is divided into three measurement ranges D(1) to D(3). However, the number of divisions may be arbitrarily determined as long as the number of divisions is two or more. In addition, the example of the measurement ranges described below is an example, and the numeric values or the like of each range may be determined arbitrarily.

In this example, the entire distance range to be measured ranges from 0.5 m to 12 m. In addition, distance range D100 actually measured is 0.4 m to 12.3 m with margins added to the distance ranges to be measured considering the measurement variation or the like.

Distance range D100 is divided into three measurement ranges D(1) to D(3). Measurement range D(1) of a short distance ranges from 0.4 m to 2.2 m. Measurement range D(2) of an intermediate distance is 1.8 m to 7.3 m, and measurement range D(3) of the long distance is 6.7 m to 12.3 m. In plural measurement ranges D(1) to D(3), the ranges of the distance are determined such that measurement ranges out of plural measurement ranges D(1) to D(3) adjacent to each other overlap each other. Specifically, the overlapping between measurement range D(1) of the short distance and measurement range D(2) of the intermediate distance ranges from 1.8 m to 2.2 m while the overlapping between measurement range D(2) of the intermediate distance and measurement range D(3) of the long distance range from 6.7 m to 7.3 m.

The overlapping ranges provide plural detection results acquired from the vicinity of the boundaries of measurement ranges D(1) to D(3). The overlapping ranges prevent a measurement omission in which the distance detection results in the vicinity of the boundaries are not acquired from any of the measurement ranges due to the measurement variation.

In addition, the lengths of plural measurement ranges D(1) to D(3) are determined such that the length of a range out of measurement ranges D(1) to D(3) which is closer to the device shown in FIG. 4 becomes shorter. The accuracy of measurement depends on the ratio of the distances. Accordingly, since the length of the range out of the plural measurement ranges which is closer becomes short, a variation of the accuracy of measurement in each measurement range can be decreased.

The influence of the ratio of the distances becomes small as the increase of the distance. Accordingly, for example, among the plural measurement ranges D(1) to D(3), the range of distance in measurement range D(1) closest to light sensor 102 of detection device 100 may be shorter than the second closest measurement range D(2). The range of distance of the third closest measurement range D(3) farther than measurement range D(2) may be identical to the range of the distance in the measurement range adjacent to the short distance measurement range or may be longer than the short distance measurement range.

In addition, the measurement in each of the measurement ranges is performed in an order of measurement range D(3) of the long distance, measurement range D(2) of the intermediate distance, and measurement range D(1) of the short distance.

As illustrated in FIG. 3, distance image 124 is configured with plural space regions P(1) to P(N) which are respective pixels of distance image 124.

Figure 5:
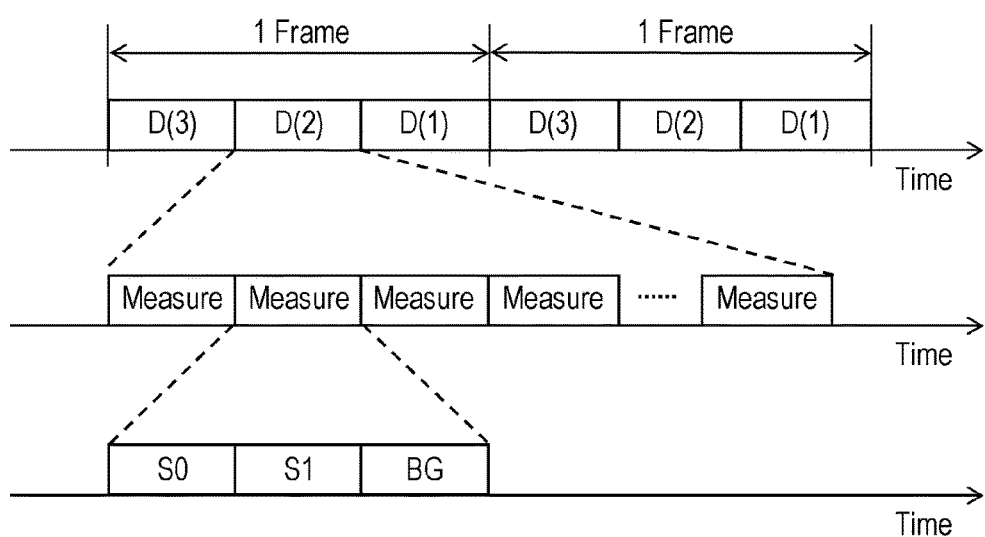
FIG. 5 illustrates timing of the distance detection processing of the distance detection device in accordance with the embodiment.

FIG. 5 is a timing chart of the distance detection processing. Here, one frame means a section used for generating detection signal 123 for generating distance image 124 corresponding to one scene at a certain time point.

As illustrated in FIG. 5, in one frame, measurement range D(3) in a long distance mode, measurement range D(2) in an intermediate distance mode and measurement range D(1) in a short distance mode are measured in this order. In addition, the measurement in each mode includes plural sub-measurements. For example, the measurement in each mode includes about a few hundred sub-measurements. An average value of the measurement results of the plural sub-measurements is used as final measurement result. Here, in order to improve the accuracy of measurement, an example in which each measurement includes plural sub-measurements will be described. However, only one measurement may be performed in each measurement.

In addition, each sub-measurement includes an S0 measurement, a S1 measurement, and a BG measurement.

Figure 6:
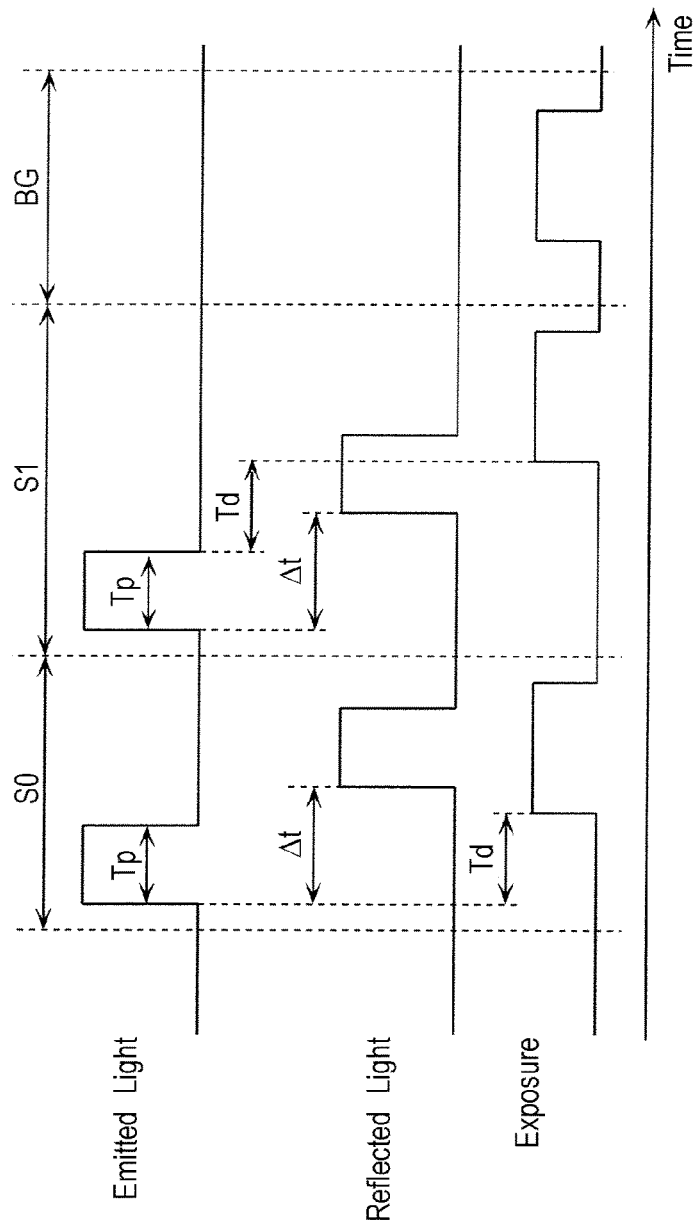
FIG. 6 illustrates timing of a measurement processing of the distance detection device in accordance with the embodiment.

FIG. 6 is a timing chart illustrating the detail of each sub-measurement. As illustrated in FIG. 6, in a pulse TOF system, light sensor 101 illuminates the object with illumination light 121 at a light emission pulse width Tp(s). Reflection light 122 obtained by reflecting illumination light 121 on the object is received by light sensor 102 after a time Δt corresponding to the distance to the object from distance detection device 100.

Light sensor 102 performs exposure at the timing synchronized to the illumination of the light emission pulse. In addition, light sensor 102 outputs detection signal 123 obtained by three types of measurements: the S0 measurement; the S1 measurement; and the BG measurement.

In the S0 measurement, the exposure period starts at a time delayed by time Td from a rising edge of the light emission pulse. Time Td is determined according to the measurement range. In the case where the object exists within the measurement range, entire reflection light 122 is received during the exposure period.

In the S1 measurement, the exposure period starts at a time delayed by time Td from a falling edge of the light emission pulse. In a case where the object is present within the measurement range, only a part of reflection light 122 is received during the exposure period according to the distance to the object.

In the BG measurement, the light emission pulse is not illuminated and only the exposure is performed. In this way, environmental light in a case of no illumination of illumination light 121 is received.

Processor 104 calculates time Δt from the signal obtained by the measurements described above and converts time Δt to a distance. Specifically, distance Depth to the object is derived from Formula 1 with signal S0 obtained from the S0 measurement, signal S1 obtained from the S1 measurement, signal BG obtained from the BG measurement, time Td(s) from the rising edge of the light emission pulse to the starting of the exposure in the S0 measurement (time from the falling edge of the light emission pulse to the starting of the exposure in the S1 measurement), and light speed c(=3×10$^8$ m/s).

$$\text{Depth} = \frac{c \cdot T_d}{2} + \frac{c \cdot T_p}{2} \cdot \left(\frac{S1 - BG}{S0 - BG}\right) \quad \text{[Formula 1]}$$

In addition, the calculation is performed for each of the plural space regions P(1) to P(N) included in the distance image. Hereinafter, a case of calculating the distance for each pixel will be described. However, the distance may be calculated for plural pixels.

Figure 7:
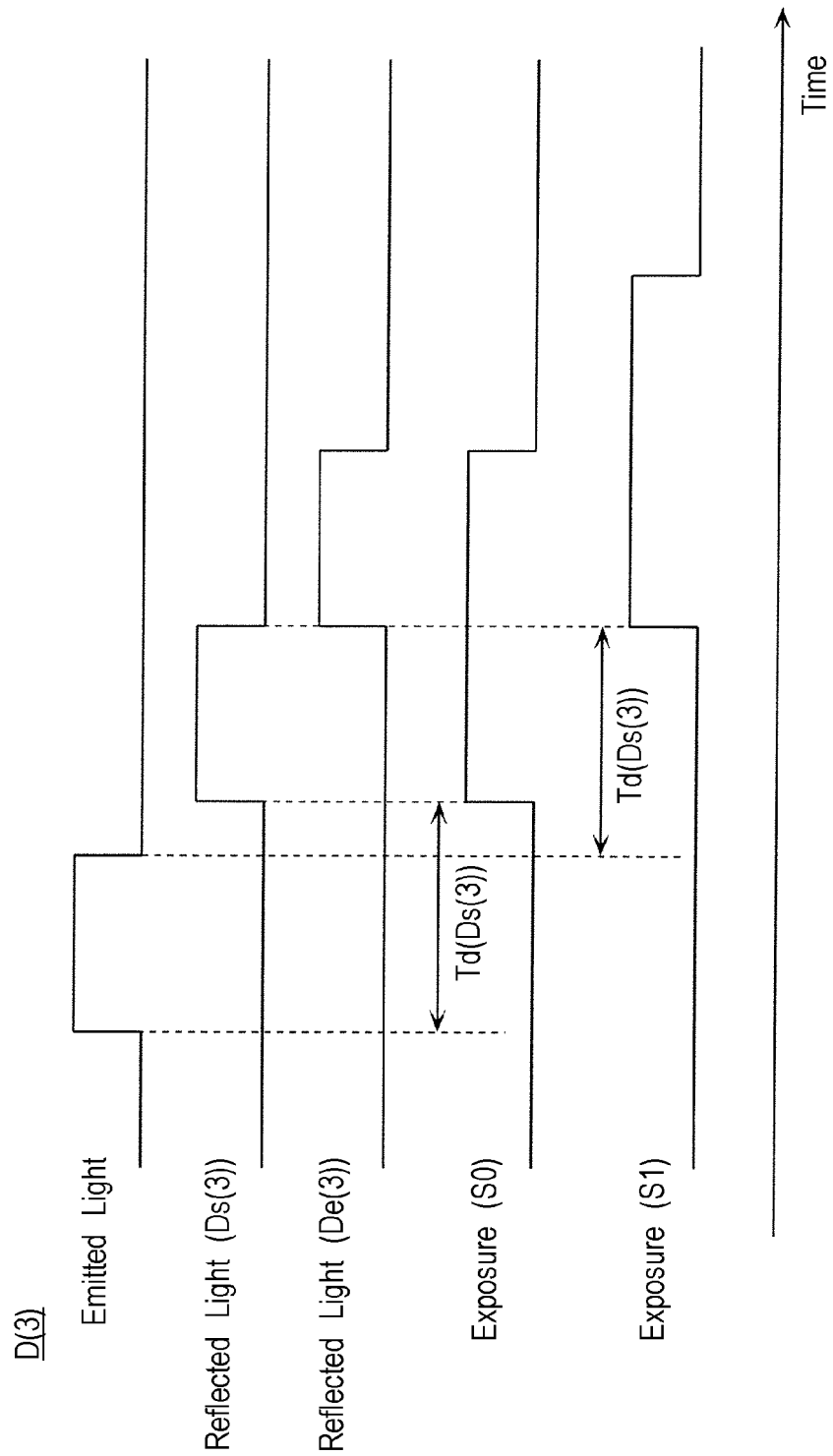
FIG. 7 illustrates timing of a long distance measurement processing of the distance detection device in accordance with the embodiment.
Figure 8:
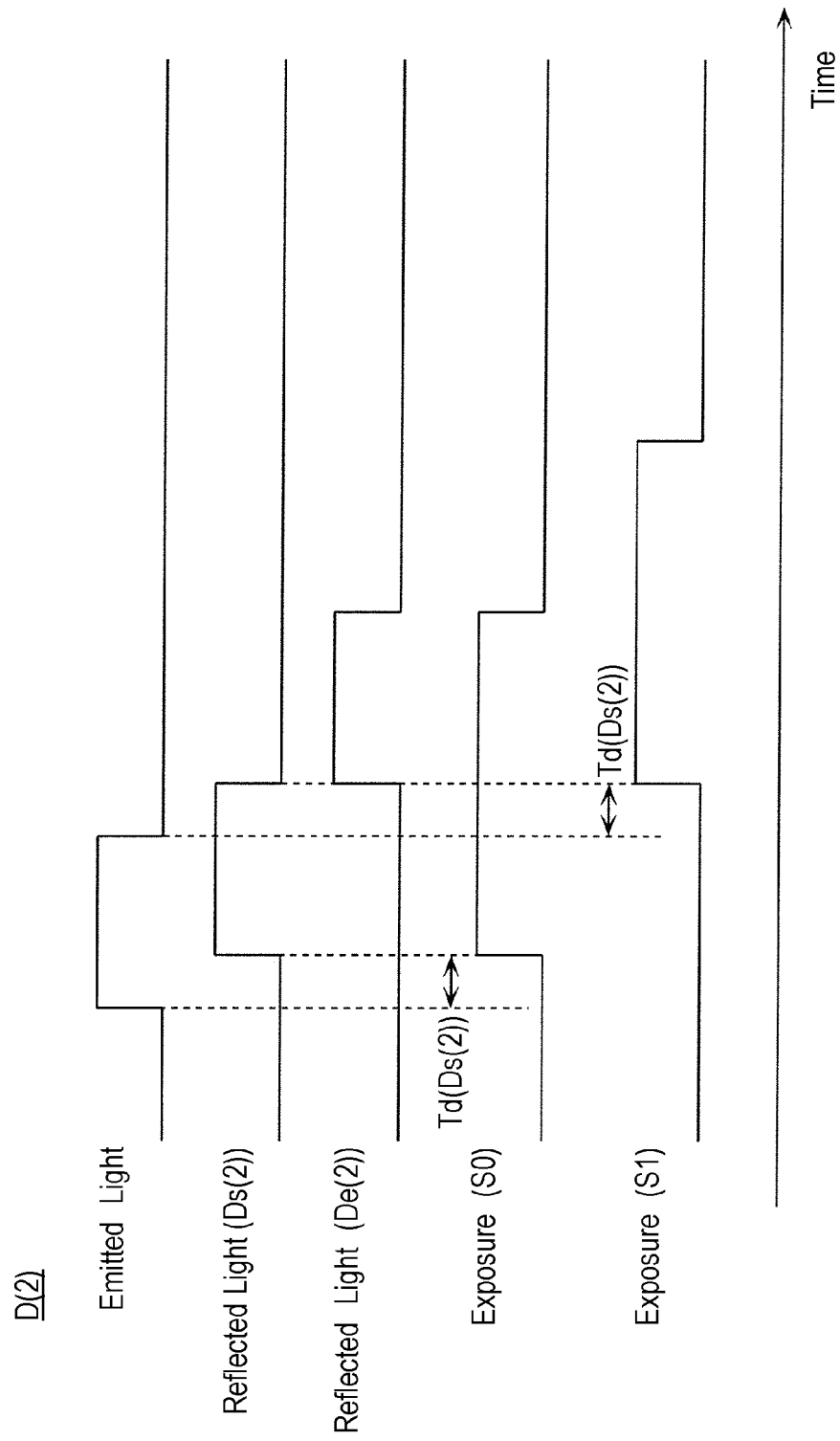
FIG. 8 illustrates timing of an intermediate distance measurement processing of the distance detection device in accordance with the embodiment.

In addition, it is possible to detect the object in the desired measurement range by adjusting time Td described above. Hereinafter, an example of the light emission and exposure timing in measurement ranges D(1) to D(3) for each mode will be described. FIG. 7, FIG. 8 and FIG. 9 illustrate examples of the light emission and the exposure timing in each of measurement range D(3) in the long distance mode, measurement range D(2) in the intermediate distance mode and measurement range D(1) in the short distance mode, respectively.

FIG. 7 to FIG. 9 illustrate reflection lights Ds(k)(k=1, 2, 3) from the object positioned at a closer end of each of measurement ranges D(1) to D(3), and illustrate reflection light De(k) from the object positioned at a farther end of each of measurement ranges D(1) to D(3).

The exposure in the S0 measurement for each mode is performed during the period from the rising edge of reflection light Ds(k) to the falling edge of reflection light De(k). The exposure period in the S0 measurement may be longer than that in the example illustrated in FIG. 7 to FIG. 9 in order to obtain the margins or the like.

The exposure in the S1 measurement for each mode starts from the falling edge of reflection light Ds(k). Here, the falling edge of reflection light Ds(k) and the rising edge of reflection light De(k) are coincident with each other, but not necessarily need to be coincident with each other.

As described above, the distance to the object included in the measurement range for each mode can be detected by controlling the light emission and exposure timing for each mode.

Each sub-measurement may be performed using a phase difference TOF system instead of the pulse TOF system.

Figure 10B:
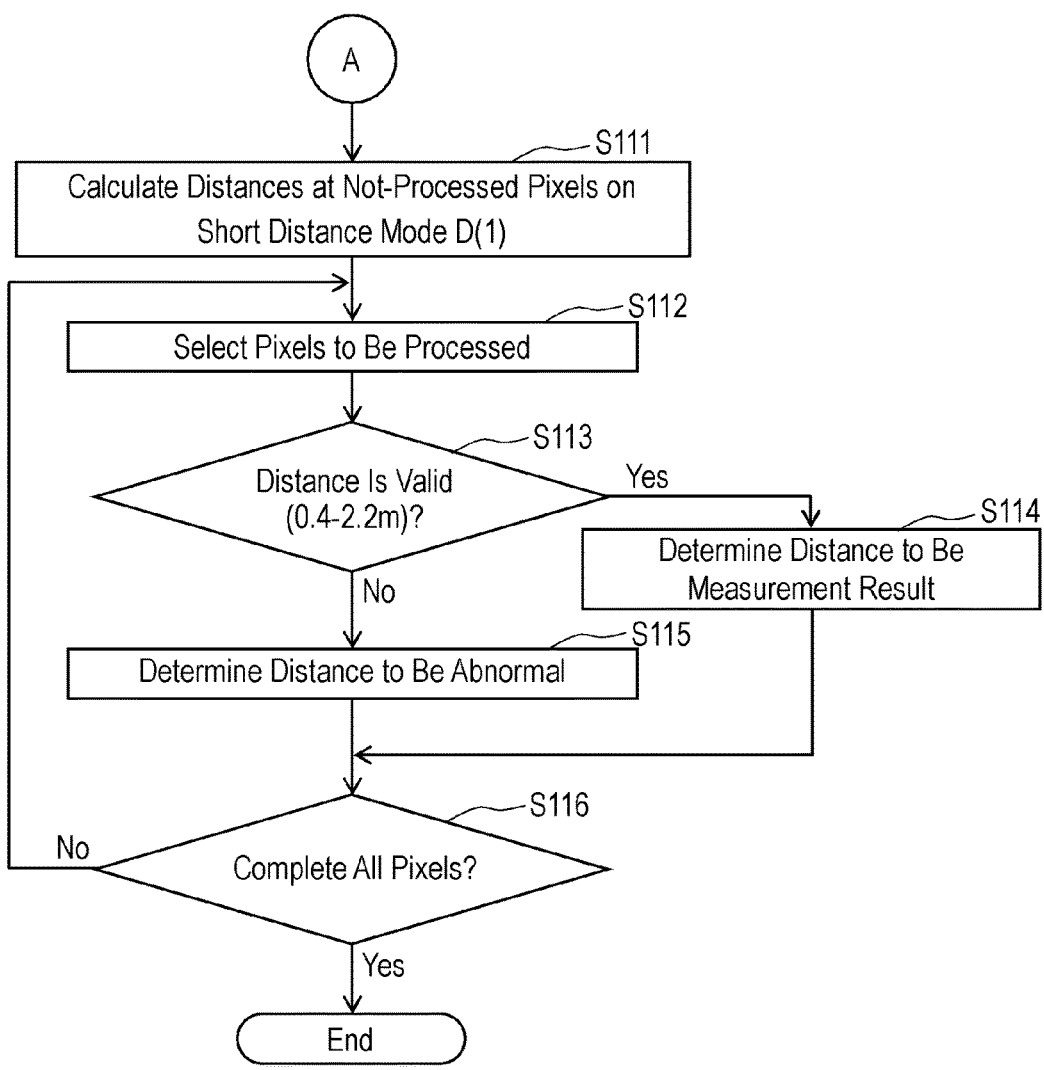
FIG. 10B is a flowchart of the distance detection processing of the distance detection device in accordance with the embodiment.

An operation of distance detection device 100 will be described below referring to FIG. 10A and FIG. 10B. FIG. 10A and FIG. 10B are flowcharts of the distance detection processing in accordance with the embodiment.

First, controller 103 performs the measurement in measurement range D(3) in the long distance mode. Processor 104 generates distance information indicating the distance of each pixel by calculating the distance (depth) of each pixel using detection signal 123 obtained from the measurement (S101).

Next, processor 104 determines whether or not the distance of each pixel is valid (S102 to S105). Here, "valid" means that the distance is within the measurement range (6.7 m to 12.3 m) of long distance. As illustrated in Formula 1, in the case where the object does not exist in measurement range D(3) measured, a value out of the range from 6.7 m to 12.3 m or an abnormal value (invalid value) is calculated as the distance.

With regard to the pixel having a valid distance in measurement range D(3), processor 104 determines that the distance is the measurement result of the pixel (S104). In addition, the processor sets the pixel not having the valid distance as an undetermined pixel, and performs the subsequent processing.

Next, controller 103 performs the measurement in measurement range D(2) in the intermediate distance mode. Processor 104 generates distance information indicating the distance of each undetermined pixel by calculating the distance of each undetermined pixel using detection signal 123 obtained from the measurement (S106).

Next, processor 104 determines whether or not the distance of each pixel is valid (S107 to S110). Here, "valid" means that the distance is within measurement range D(2) of the intermediate distance (1.8 m to 7.3 m). As illustrated in Formula 1, in the case where the object does not exist in measurement range D(2), a value out of the range from 1.8 m to 7.3 m or an abnormal value is calculated as the distance.

With regard to the pixel having a valid distance in measurement range D(2), processor 104 determines that the distance is the measurement result of the pixel (S109). In addition, processor 104 sets the pixel not having the valid distance as an undetermined pixel, and performs the subsequent processing.

Next, controller 103 performs the measurement in measurement range D(1) in the short distance mode. Processor 104 generates the distance information indicating the distance of each undetermined pixel by calculating the distance of each undetermined pixel using detection signal 123 obtained from the measurement (S111).

Next, processor 104 determines whether or not the distance of each pixel is valid (S112 to S116). Here, "valid" means that the distance is within measurement range D(1) of the short distance (0.4 m to 2.2 m). As illustrated in Formula 1, in the case where the object does not exist in measurement range D(1), a value out of the range from than 0.4 m to 2.2 m or an abnormal value is calculated as the distance.

With regard to the pixel having a valid distance in measurement range D(1), processor 104 determines that the distance is the measurement result of the pixel (S114). In addition, processor 104 sets the distance of the pixel not having the valid distance as an abnormal value (S115).

As described above, the distance information and distance image 124 indicate distances of the plural pixels, that is, plural space regions P(1) to P(N) included in distance image 124. In the case where the distance of the pixel is indicated by the distance information of a first measurement range out of measurement ranges D(1) to D(3) for each of the plural pixels, and where the distance of the pixel does not indicated by the distance information of the measurement range longer than the first measurement range, processor 104 uses the distance indicated by the distance information as the distance of the pixel indicated in distance image 124. In addition, in that case where the distance is not indicated by the distance information of the first measurement range and the distance is indicated by the distance information of a second measurement range out of the measurement ranges D(1) to D(3) which is closer than the first measurement range, processor 104 uses the distance indicated by the distance information of the second measurement range as the distance of the pixel indicated in distance image 124. In addition, in the pixel, in the case where an object does not exist in any of the measurement ranges, that is, in the case where an object does not exist in distance range D100, the distance of the pixel is not indicated by the distance information of any of the measurement range. For example, the first measurement range and the second measurement range are the measurement ranges adjacent to each other.

Figure 11:
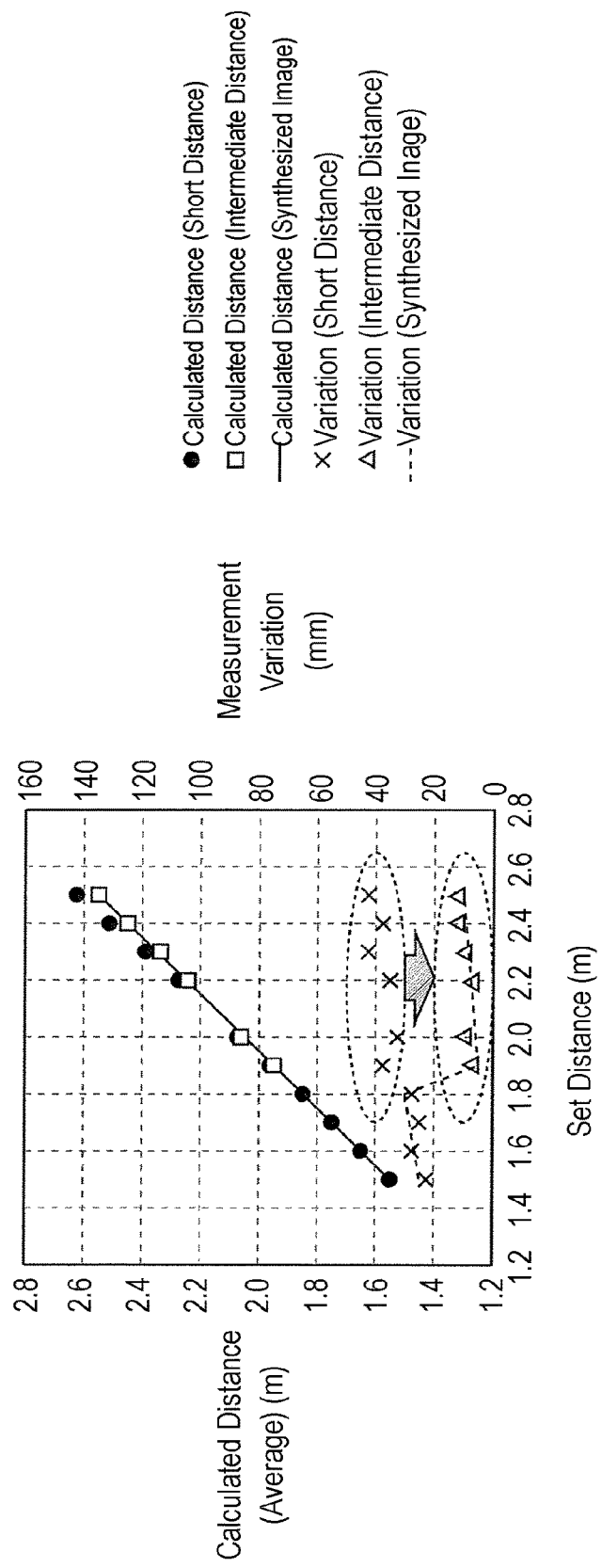
FIG. 11 illustrates measurement variations in the short distance measurement and the intermediate distance measurement of the distance detection device in accordance with the embodiment.

Here, in measuring a certain distance, the measurement result variation in the measurement mode of the longer distance is smaller than the measurement variation in the measurement mode of the shorter distance. FIG. 11 illustrates the measurement variation on measuring a center pixel in the vicinity of a boundary (2 m) of the measurement range D(1) in the short distance mode and the distance range D(2) in the intermediate distance mode.

In the vicinity of the boundary described above, since the measurement ranges D(1) and D(2) overlap, for an object at the same distance, the measurement result from measurement range D(1) in the short distance mode and the measurement result from measurement range D(2) in the intermediate distance mode are obtained. As illustrated in FIG. 11, the measurement variation of the measurement result from measurement range D(2) in the intermediate distance mode is smaller than that of the measurement result from measurement range D(1) in the short distance mode. That is, a reliability of the measurement result from measurement range D(2) in the intermediate distance mode is higher than that of the measurement result from measurement range D(1) in the short distance mode. Here, an example of the measurement variation at the boundary between measurement range D(1) of the short distance and measurement range D(2) of the intermediate distance, and the result shows a similar trend at the boundary between measurement range D(2) of the intermediate distance and measurement range D(3) of the long distance.

Accordingly, in the present exemplary embodiment, as described above, by adopting the measurement results in an order from the measurement result of the long distance, the measurement result of the long distance is adopted in the overlapping measurement range. In this way, in the overlapping region, the measurement result with higher reliability can be adopted.

In addition, in the case where the distance of the pixel in the distance information of the first measurement range for each of the plural pixels, processor 104 does not generates the distance information of the second measurement range. In this way, in the case where the distance is obtained for the long distance, processor 104 does not perform the calculation for the shorter distance.

Figure 12:
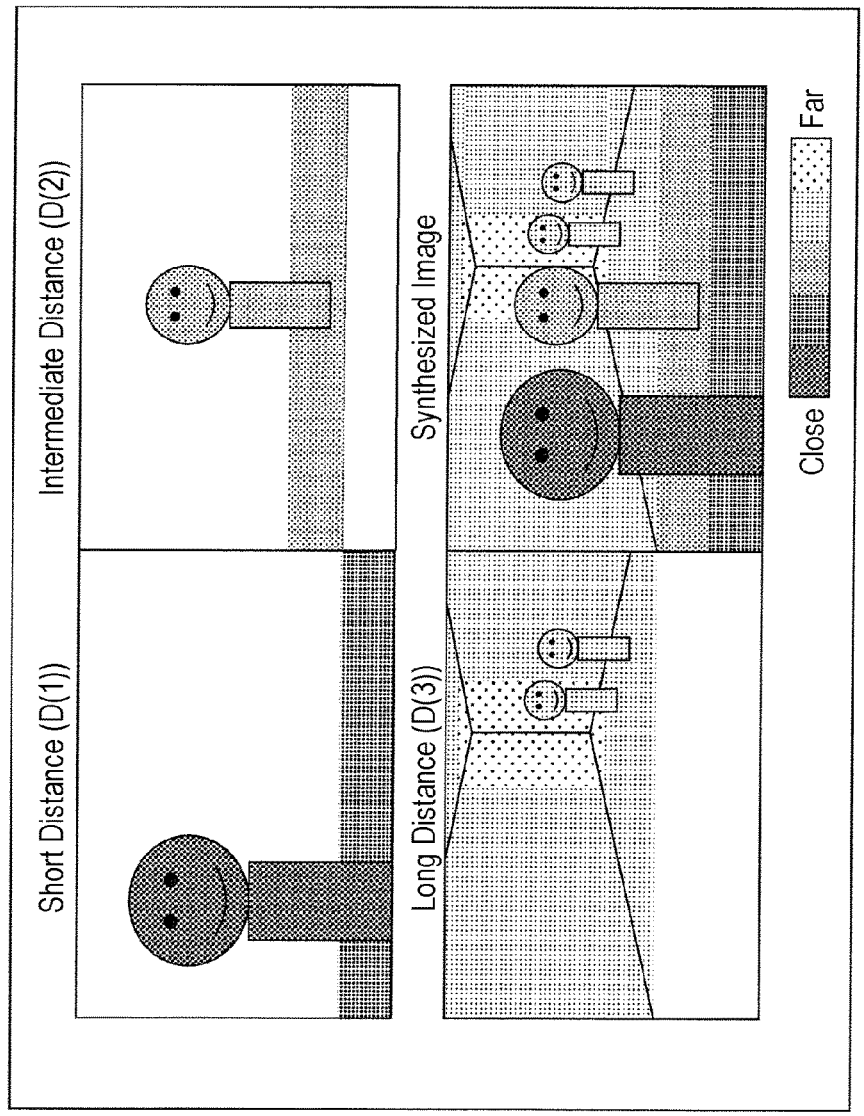
FIG. 12 illustrates distance images of each distance and a composite image of the distance detection device in accordance with the embodiment.

FIG. 12 illustrates an example of the measurement result (distance information) in measurement ranges D(1) to D(3) and distance image 124 after composition. As illustrated in FIG. 12, in the measurement result in measurement ranges D(1) to D(3), only the distance to the object positioned at the set measurement range is included. In FIG. 12, pixels having distances other than measurement ranges D(1) to D(3) are indicated as "no result (white)". In addition, by composing the distance information items in three measurement ranges D(1) to D(3), one distance image 124 indicating the distance to the object in the wide range of distance range D100 is generated.

In steps S101, S106, and S111 shown in FIG. 10A and FIG. 10B, the measurement (generation of detection signal 123) and the calculation (calculation of the distance information) are continuously performed. However, the measurement processing may be performed any arbitrary timing as long as being performed before the corresponding calculation processing. For example, the measurement in three modes is performed in advance and measurement result is stored in the memory, and then, the calculation processing may be sequentially performed using the measurement result stored in the memory.

Figure 13:
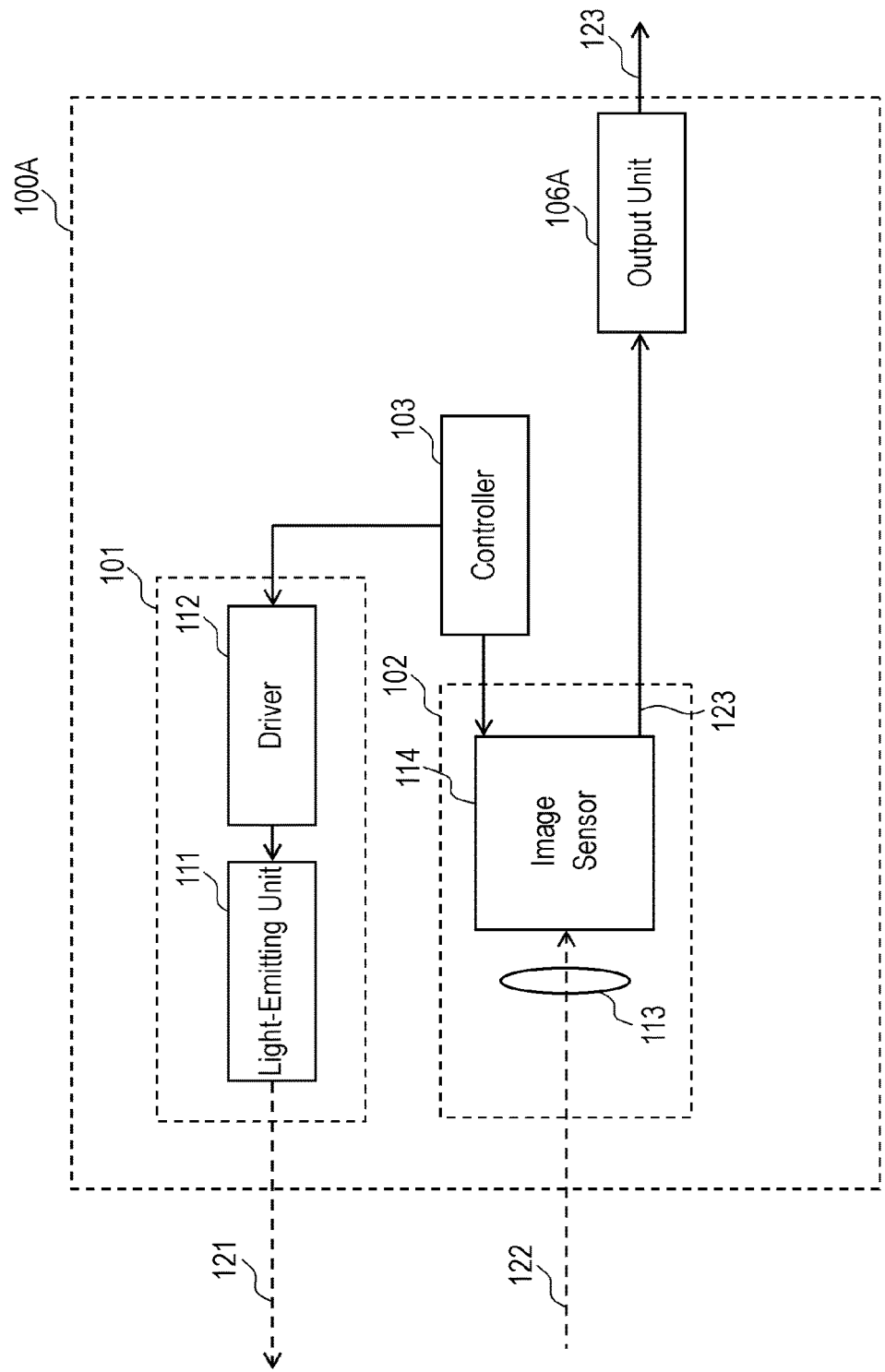
FIG. 13 is a block diagram of another distance detection device in accordance with the embodiment.

In addition, distance detection device 100 performs both the measurement processing and the calculation processing, however, only the measurement processing may be performed. FIG. 13 is a block diagram of another distance detection device 100A in accordance with the embodiment in this case. In FIG. 13, components identical to those of distance detection device 100 shown in FIG. 1 are denoted by the same reference numerals. Distance detection device 100A illustrated in FIG. 13 does not include processor 104 and memory 105 described above. In addition, output unit 106A outputs detection signal 123 of each mode obtained from light sensor 102 to an external device.

For example, the external device generates distance image 124 using detection signal 123 generated in distance detection device 100A by performing the processing same as that by processor 104.

As described above, distance detection device 100 in accordance with the embodiment generates distance image 124 indicating the distance to the object positioned within distance range D100 to be measured using the time of flight (TOF) system. Light source 101 illuminates the object with light. Light sensor 102 generates detection signal 123 by receiving the reflection light which is the illumination light from light source 101 reflected on the object. Controller 103 controls the exposure timing of light sensor 102 with respect to the illumination timing of the light from light source 101 in the plural measurement ranges D(1) to D(3) into which the distance range D100 is divided. Processor 104 is configured to generate the distance information by calculating the distances to the object within each measurement range of the plural measurement ranges D(1) to D(3) based on detection signal 123 in the each measurement range of the plural measurement ranges D(1) to D(3). In addition, processor 104 is configured to generate distance image 124 indicating the distance to the object within distance range D100 using the distance information in the each measurement range of the plural measurement ranges D(1) to D(3).

According to this configuration, distance detection device 100 can generate one distance image 124 corresponding to a wide distance range D100. Therefore, an amount of processing for the evaluation processing using distance image 124 can be decreased and a data amount of distance image 124 can be decreased.

In the measuring methods in the devices disclosed in PTL 1 and PTL 2, in the case where the object exists over wide distance measurement ranges, since it is not possible to measure the entire measurement ranges in one time, a distance image is output for each of the adjusted distance ranges. Therefore, when evaluating the results from the wide ranges, it is needed to evaluate plural image data, not a single image data. In addition, since the plural image data are present, the data amount increases.

Distance detection device 100 in accordance with the embodiment divides the distance range D100 to be measured into the plural measurement ranges D(1) to D(3), and generates a distance image for each measurement range of the plural measurement ranges D(1) to D(3) based on the measurement result in each of measurement ranges D(1) to D(3). Furthermore, distance detection device 100 generates distance image 124 corresponding to distance range measurement D100 to be measured by composing the distance images of measurement ranges D(1) to D(3).

In this way, distance detection device 100 can output only one distance image 124, and thus, it is possible to decrease the amount of processing for the evaluation processing using distance image 124 and decrease the data amount of distance image 124.

For example, the distance information and the distance image indicate the distance of each space region of plural space regions P(1) to P(N) included in distance image 124. Plural measurement ranges D(1) to D(3) may include a first measurement range and a second measurement range closer than the first measurement range. In this case, in the case where the distance of each space region of the space regions P(1) to P(N) is indicated by the distance information of the first measurement range with respect to the each space region of the plural space regions, processor 104 is configured to generate the distance image indicating the distance to the object within the distance range using the distance indicated by the distance information as the distance of the each space region of the space regions indicated in the distance image. In addition, in the case where the distance of each space region of the space regions P(1) to P(N) is not indicated by the distance information of the first measurement range with respect to the each space region of the plural space regions, processor 104 is configured to generate the distance image indicating the distance to the object within the distance range using the distance indicated in the distance information of the second measurement range as the distance of the each space region of the space regions indicated in the distance image.

According to this configuration, since distance detection device 100 preferentially uses the measurement result of the long distance side in which the measurement variation is small, it is possible to improve the reliability of distance image 124.

For example, in the case where the distance of each space region of the space regions P(1) to P(N) is indicated by the distance information of the first measurement range with respect to the each space region of the plural space regions, processor 104 may not generate the distance information of the second measurement range.

According to this configuration, in the case where the distance in the long distance side is obtained, distance detection device 100 does not perform the calculation for the short distance side, and thus, it is possible to decrease the amount of calculation.

For example, among the plural measurement ranges D(1) to D(3), the range of distance in measurement range D(1) closest to distance detection device 100 may be shorter than that in measurement range D(2) second nearest to the device.

According to this configuration, distance detection device 100 can decrease the variation of the accuracy of each distance information.

For example, the measurement ranges of the plural measurement ranges D(1) to D(3) adjacent to each other may overlap each other.

According to this configuration, distance detection device 100 can prevent the missing of the measurement in the vicinity of the boundaries of measurement ranges D(1) to D(3).

In addition, in the distance detection method in accordance with the embodiment, distance image 124 indicating the distance to the object positioned within distance range D100 to be measured can be generated using the time of flight (TOF) system. In this distance detection method, in each measurement range of the plural measurement ranges D(1) to D(3) into which distance range D100 is divided, the exposure timing of light sensor 102 is controlled with respect to the illumination timing of the light from light source 101. In each measurement range of the plural measurement ranges D(1) to D(3), the distance to the object within the each measurement range is calculated based on the detection signal output from light sensor 102 that received the reflection light obtained by reflecting the illumination light from light source 101 on the object, and then, the distance information of each of measurement ranges is generated. The distance image indicating the distance to the object within the distance range is generated using the distance information in each measurement range of the plural measurement ranges D(1) to D(3).

In this distance detection method, since one distance image 124 corresponding to wide distance range D100 can be generated, the amount of processing for the evaluation processing using the distance image can be decreased and the data amount of distance image 124 can be decreased.

For example, the distance information and the distance image may indicate the distances of each space region of the plural space regions P(1) to P(N) included in the distance image. In addition, the plural measurement ranges D(1) to D(3) include the first measurement range and the second measurement range which is closer than the first measurement range. In the case where the distance of the each space region is indicated by the distance information of the first measurement range with respect to the each space region of the plural space regions P(1) to P(N), the distance image may be generated using the distance indicated by the distance information as the distance of the each space region included in the distance image. In addition, in the case where the distance of the each space region is not indicated by the distance information of the first measurement range with respect to the each space region of the plural space regions P(1) to P(N), the distance image may be generated using the distance indicated by the distance information of the second measurement range as the distance of the each space region included in the distance image.

According to the distance detection method, the measurement result of the long distance side in which the measurement variation is small is preferentially used, it is possible to improve the reliability of the distance image.

In addition, another distance detection device 100A in accordance with the embodiment generates the detection signal used for generating distance image 124 indicating the distance to the object positioned within distance range D100 to be measured using the time of flight (TOF) system. Distance detection device 100A includes light source 101 that illuminates an object with light, light sensor 102, controller 103, and output unit 106A. Light sensor 102 generates the detection signal by receiving the reflection light which is the illumination light from light source 101 reflected on the object. Controller 103 controls the exposure timing of light sensor 102 with respect to the illumination timing of the light from light source 101 in the plural measurement ranges D(1) to D(3) into which the distance range D100 is divided. Output unit 106A outputs the detection signal generated in each measurement range of the measurement ranges.

According to this configuration, distance detection device 100A can generate the detection signal used for generating one distance image 124 corresponding to wide distance range D100, the amount of processing for the evaluation processing using the distance image can be decreased and the data amount of the distance image can be decreased.

These comprehensive or specific aspects may be realized by a system, a method, an integrated circuit, a computer program, or a recording medium such as a computer-readable CD-ROM, or may be realized by any arbitrary combinations of the system, the method, the integrated circuit, the computer program, and the recording medium.

Distance detection devices 100 and 100A in accordance with the embodiment are described above. However, the present invention is not limited to the exemplary embodiment.

In addition, all or a part of the processing units in distance detection devices 100 and 100A in accordance with the embodiment are typically implemented by LSIs, integrated circuits. Those may be in individual chips or may be in one chip including all or a part of the units.

In addition, the integrated circuit may be realized by a dedicated circuit or a general-purpose processor, not limited to the LSI. A field programmable gate array (FPGA) which is programmable after manufacturing the LSI or a reconfigurable processor in which a connection or setting of a circuit cell in the LSI can be reconfigured may be used.

In accordance with the embodiment, each configuration element is configured with dedicated hardware, however, may be realized by executing a software program suitable for each configuration element. Each configuration element may be realized by a program execution unit such as a CPU or a processor reading and executing a software program stored in a recording medium such as a hard disk or a semiconductor memory.

The present embodiment may be a program described above or may be a non-transitory computer readable recording medium in which the program described above is stored. In addition, the program described above can be distributed via a transmission medium such as the Internet.

In addition, all the numbers used above are examples for specifically describing the present invention, and the exemplary embodiment of the present invention is not limited to the numbers exemplified above.

In addition, the division of the function blocks in the block diagrams is examples, and plural function blocks may be realized in one function block, one function block may be divided into plural, or a part of the functions may be moved to another function block. In addition, the functions of the plural function blocks having similar functions may be processed by single hardware or software in parallel or in a time division manner.

In addition, the execution order of the steps in the flowcharts illustrated above is an example for specifically describing the present exemplary embodiment, and may be an order other than that described above. In addition, a part of the steps described above may be executed concurrently with another step (in parallel).

Distance detection devices 100 and 100A in accordance with the embodiment are described based on the exemplary embodiment, but not limited to the exemplary embodiment. Without departing from the spirit of the present invention, an aspect in which various modifications that occur to those skilled in the art are subjected to the present exemplary embodiment or an aspect constructed in combination of configuration elements in another exemplary embodiment may be included in ranges of one or plural aspects.

INDUSTRIAL APPLICABILITY

The present invention can be applied to a distance detection device.

REFERENCE MARKS IN THE DRAWINGS 100, 100A distance detection device
101 light source
102 light sensor
103 controller
104 processor
105 memory
106, 106A output unit
111 light-emitting unit
112 driver
113 lens
114 image sensor

The invention claimed is:
1. A distance detection device that generates a distance image indicating a distance to an object positioned within a distance range for measurement by a time of flight (TOF) system, the distance detection device comprising:
a light source that emits light;
a light sensor that generates a detection signal by receiving a reflection light obtained by reflecting the light emitted from the light source on the object;
a controller that controls an exposure timing of the light sensor with respect to illumination timing of the light from the light source in each measurement range of a plurality of measurement ranges into which the distance range is divided; and
a processor configured to:
generate distance information by calculating a distance to the object within the each measurement range based on the detection signal in the each measurement range, and generate the distance image indicating the distance to the object within the distance range based on the distance information within the each measurement range, wherein the distance information and the distance image indicate a distance at each space region of a plurality of space regions included in the distance image, wherein the plurality of measurement ranges include a first measurement range and a second measurement range closer than the first measurement range, and wherein the processor is configured to:
  in a case where the distance of the each space region is indicated by distance information within the first measurement range for the each space region, generate the distance image indicating the distance to the object within the distance range using the distance indicated by the distance information within the first measurement range as the distance of the each space region, and
  in a case where the distance of the each space region is not indicated by the distance information within the first measurement range for the each space region, generate the distance image indicating the distance to the object within the distance range using the distance indicated by distance information within the second measurement range as the distance of the each space region of the distance image.

2. The distance detection device of claim 1, wherein the processor does not generate the distance information within the second measurement range in a case where the distance of the each space region is indicated by the distance information within the first measurement range for the each space region.

3. The distance detection device of claim 1, wherein, a range of a distance of a measurement range closest to the distance detection device among the plurality of measurement ranges is shorter than that a range of a distance of a measurement range second closest to the device among the plurality of measurement ranges.

4. The distance detection device of claim 1, wherein measurement ranges adjacent out of the plurality of measurement ranges overlap each other.

5. A distance detection method of generating a distance image indicating a distance to an object positioned within a distance range targeted for measurement using a time of flight (TOF) system, the method comprising:
  controlling exposure timing of a light sensor with respect to illumination timing of light emitted from a light source in each measurement range of a plurality of measurement ranges into which the distance range is divided; and
  for the each measurement range, generating distance information within the each measurement range by calculating a distance to the object within the each measurement range based on a detection signal output from the light sensor that receives a reflection light obtain by reflecting an illumination light emitted from the light source reflected on the object in each of the measurement ranges of the plurality of measurement ranges; and
  generating the distance image indicating the distance to the object within the distance range using the distance information within the each measurement range, wherein the distance information and the distance image indicate a distance of each of a plurality of space regions included in the distance image, wherein the plurality of measurement ranges include a first measurement range and a second measurement range closer than the first measurement range, and wherein said generating the distance image comprises:
  in a case where the distance of the each space region is indicated by distance information within the first measurement range for the each space region, generating the distance image indicating the distance to the object within the distance range using the distance indicated by the distance information within the first measurement range as the distance of the each space region, and
  in a case where the distance of the each space region is not indicated by the distance information within the first measurement range for the each space region, generating the distance image indicating the distance to the object within the distance range using the distance indicated by distance information within the second measurement range as the distance of the each space region of the distance image.

* * * * *